United States Patent
Richardson et al.

(10) Patent No.: US 8,116,726 B2
(45) Date of Patent: Feb. 14, 2012

(54) PARENT AND CHILD MOBILE COMMUNICATION DEVICES WITH FEATURE CONTROL AND CALL-BACK

(75) Inventors: Roger D. Richardson, Mundelein, IL (US); Chad L. Biederman, Round Lake, IL (US); Ola A. Mneimneh, Streamwood, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1023 days.

(21) Appl. No.: 11/848,204

(22) Filed: Aug. 30, 2007

(65) Prior Publication Data

US 2009/0061907 A1    Mar. 5, 2009

(51) Int. Cl.
*H04M 11/00* (2006.01)

(52) U.S. Cl. ............... 455/405; 455/411; 455/404.1; 455/418; 455/456.1

(58) Field of Classification Search ............. 455/404.1, 455/405, 411, 418–420, 456.1; 718/100; 345/156
See application file for complete search history.

(56) References Cited

U.S. PATENT DOCUMENTS

| | | | |
|---|---|---|---|
| 4,588,901 A | 5/1986 | Maclay et al. | |
| 5,618,045 A | 4/1997 | Kagan et al. | |
| 6,118,744 A | 9/2000 | Sturgeon et al. | |
| 6,464,027 B1 | 10/2002 | Dage et al. | |
| 6,600,914 B2* | 7/2003 | Uhlik et al. | 455/404.1 |
| 6,622,010 B1 | 9/2003 | Ichimaru | |
| 6,662,365 B1 | 12/2003 | Sullivan et al. | |
| 6,684,062 B1 | 1/2004 | Gosior et al. | |
| 6,684,240 B1 | 1/2004 | Goddard | |
| 6,704,929 B1 | 3/2004 | Ozer et al. | |
| 6,722,984 B1 | 4/2004 | Sweeney, Jr. et al. | |
| 6,732,367 B1 | 5/2004 | Ellis et al. | |
| 6,754,904 B1 | 6/2004 | Cooper et al. | |
| 6,782,281 B1 | 8/2004 | Nagasawa | |
| 7,206,559 B2 | 4/2007 | Meade, II | |
| 7,283,827 B2* | 10/2007 | Meadows et al. | 455/456.1 |
| 7,652,660 B2* | 1/2010 | Chen et al. | 345/156 |
| 2003/0233436 A1 | 12/2003 | Slemmer et al. | |
| 2003/0233660 A1 | 12/2003 | Slemmer et al. | |
| 2004/0003051 A1 | 1/2004 | Krzyzanowski et al. | |
| 2004/0019667 A1 | 1/2004 | Slemmer et al. | |
| 2004/0032503 A1 | 2/2004 | Monden et al. | |
| 2004/0040034 A1 | 2/2004 | Sullivan et al. | |
| 2004/0132480 A1 | 7/2004 | Parker et al. | |
| 2004/0143838 A1 | 7/2004 | Rose | |
| 2004/0166878 A1* | 8/2004 | Erskine et al. | 455/456.1 |
| 2004/0180648 A1* | 9/2004 | Hymel et al. | 455/418 |
| 2004/0180673 A1 | 9/2004 | Adams et al. | |
| 2004/0259537 A1 | 12/2004 | Ackley | |
| 2005/0014531 A1 | 1/2005 | Findikli | |
| 2005/0095981 A1 | 5/2005 | Benco | |
| 2007/0200659 A1 | 8/2007 | Kim | |
| 2008/0155538 A1* | 6/2008 | Pappas | 718/100 |

* cited by examiner

*Primary Examiner* — Dwayne Bost
*Assistant Examiner* — Inder Mehra

(57) ABSTRACT

A parent mobile station (100) may establish a communication link (106) via a wireless network (104) using any appropriate technology. The parent mobile station (100) may send a control message over the communication link (106) which causes the child mobile station (101) to take various actions including being forced to call back the parent mobile station (100) upon any detected user action on a user interface of the child mobile station (101). For example, the child mobile station (101) may be locked such that no calls may be placed. Other actions of the child mobile station (101) may also be blocked such as, but not limited to, text messaging and Internet access. The command message may be a Short Message Service (SMS) message, a Session Initiation Protocol (SIP) message or any other appropriate message.

14 Claims, 3 Drawing Sheets

PARENT AND CHILD MOBILE COMMUNICATION DEVICES WITH FEATURE CONTROL AND CALL-BACK

FIELD OF THE DISCLOSURE

The present disclosure is related to mobile communication devices and remotely controlling various capabilities of one or more remote mobile communication devices from a controlling mobile communication device.

BACKGROUND

Mobile communications devices such as mobile phones have become embedded in society as a necessity. Mobile phones have not only increased productivity and connectedness but have also become perceived as providing safety and security. Thus, some parents provide their children with mobile phones for the purpose of being able to call home, or place an emergency call if necessary.

With respect to productivity and connectedness, some businesses provide their employees with mobile phones for the purpose of business communications. Both of these scenarios as well as others also provide the recipients of such devices with the capability of using the device for various purposes unrelated to the provider's intentions. This may result in cost to the provider as a result of, for example, phone calls, text messaging, Internet usage, etc.

A provider would therefore benefit from having control over any provided devices with respect to the capabilities of the device. Parents may have additional concerns related to the activities or safety of their children.

Therefore a need exists for apparatuses and methods for enabling a provider to have some control over mobile communications devices provided by the provider to a recipient for uses designated by the provider.

DETAILED DESCRIPTION

Figure 1:
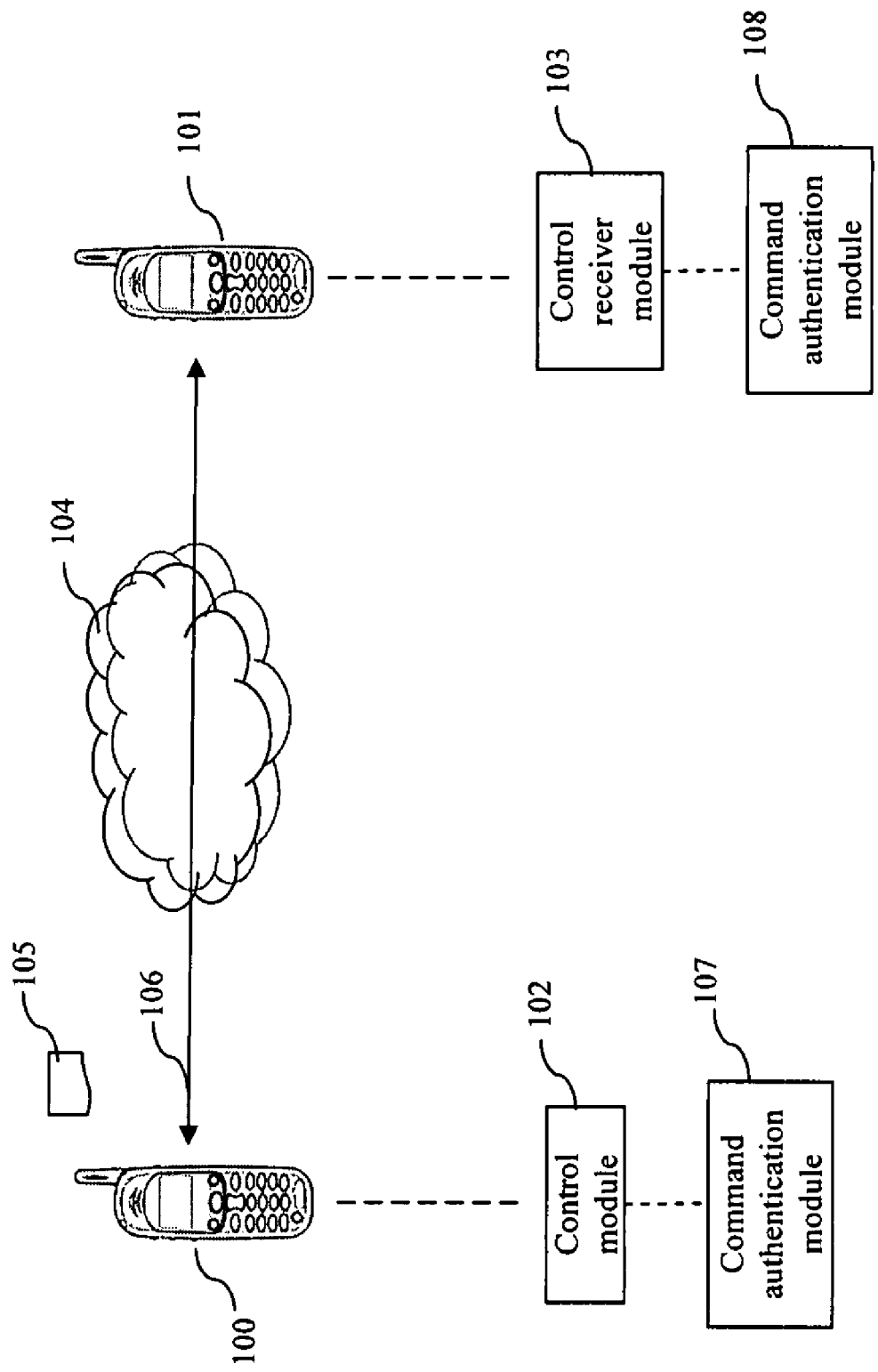
FIG. 1 is a diagram illustrating the mobile communication devices in accordance with the embodiments.

FIG. 1 illustrate a "parent" mobile station 100 in accordance with the embodiments and a "child" mobile station 101 also in accordance with the embodiments. The parent mobile station 100 comprises a control module 102 which may be a software module operational on a processor of the parent mobile station 100. The child station 101 comprises a control receiver module 103 which may also be a software module operational on a processor of the child mobile station 101. Either control module 102 or control receiver module 103 may be implemented in software or firmware. Parent mobile station 100 and child mobile station 101 may also comprise a command authentication module, such as command authentication modules 107 and 108, respectively, for authenticating commands sent from parent mobile station 100 and received by child mobile station 101.

The parent mobile station 100 may establish a communication link 106 via a wireless network 104 using any appropriate technology. The parent mobile station 100 may send a control message over the communication link 106 which causes the child mobile station 101 to take various actions. For example, the child mobile station 101 may be locked such that no calls may be placed. Other actions of the child mobile station 101 may also be blocked such as, but not limited to, text messaging and Internet access. The command message may be a Short Message Service (SMS) message, a Session Initiation Protocol (SIP) message or any other appropriate message. The command message may be authenticated by a network entity of the network 104 in some embodiments, and will not be passed to the child mobile station 101 unless the parent mobile station 100 is successfully authenticated to send command messages.

Figure 2:
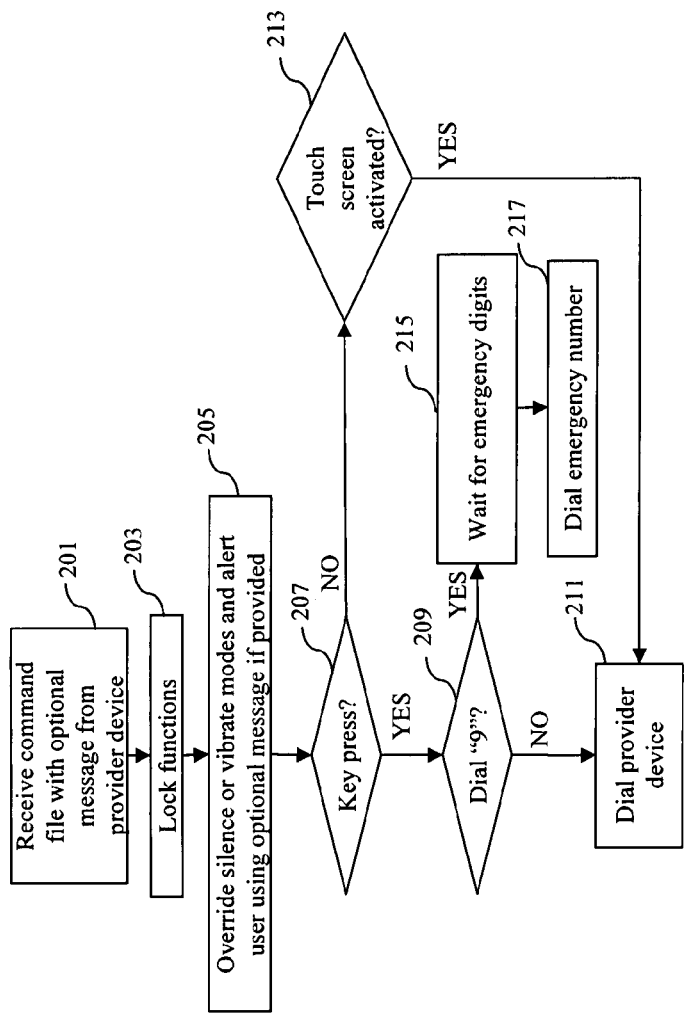
FIG. 2 is a flow chart illustrating operation of a child mobile station in accordance with the embodiments.

FIG. 2 is a flow chart that provides further details of operation of the child mobile station 101 in accordance with the embodiments. In 201, the child mobile station 101 receives a command message from the parent mobile station 100 as was discussed. The user of the parent mobile station 100 may optionally attach a file 105 which may be an audio or video file, or video file with audio, or a text message. The parent mobile station 100 may have the capability to control several child mobile stations. The control module 102 provides the parent mobile station 100 with a user interface and various menus to select the recipient child mobile station, which for this example is child mobile station 101. The menus of the user interface provide the option of attaching a file which may be created prior to, or during, access to the user interface. For example, the user of the parent mobile station 100 may be given an option to record a message.

For example, the provider may record the message, "Call home now!" and save it as file 105. The provider may also be given an option to block only certain functions, for example the menu may provide a "block all," "block text messaging," "block Internet," etc. from which the provider may select one or more unless the "block all" option is selected in which case all functions would be blocked. Returning to FIG. 2, the child mobile station 101 receives the message sent from parent mobile station 100. The message may include the optional message as discussed. The control receiver module 103 of the child mobile station 101 will process the message and proceed to lock all, or otherwise the selected functions, as shown in 203.

Because the user of the child mobile station 101 may have set the ringer to silent or vibrate mode, these modes may be overridden as an option by the parent mobile station 100 user via the control module 102 user interface. Thus in 205, the child mobile station 101 setting may be overridden and an alert will be provided. The alert may be a default sound determined by the control receive module 103 or may be provided by playing or displaying the file 105 that was sent by the parent mobile station 100. For this example, the audio message "Call home now!" would be played to alert the user of child mobile station 101.

Subsequently, the control receiver module 103 will monitor the child mobile station 101 user interfaces for any activity such as key presses in 207, or touch screen activation in 213 on mobile stations that include touch screens. If a key press is detected in 207 then the control receiver module 103 will determine whether the key was a digit related to an emergency number sequence, such as "911," "112," etc. depending on the location or country. For example, in the United States, a "9"

would indicate that an emergency call may be in initiation so that in 215 the control receiver module will wait for a predetermined time, such as a few seconds, for further emergency digits in 217.

However, any other digit will cause the child mobile station 101 to immediately dial, without user intervention, the parent mobile station 100 as in 211. Likewise, for child mobile stations having a touch screen, any touch screen activity in 213 would result in the child mobile station 101 dialing the parent mobile station 100 as in 211. The parent mobile station 100 may use the control module 102 user interface to send an "unlock" message for all, or for one or more, previously locked features.

Figure 4:
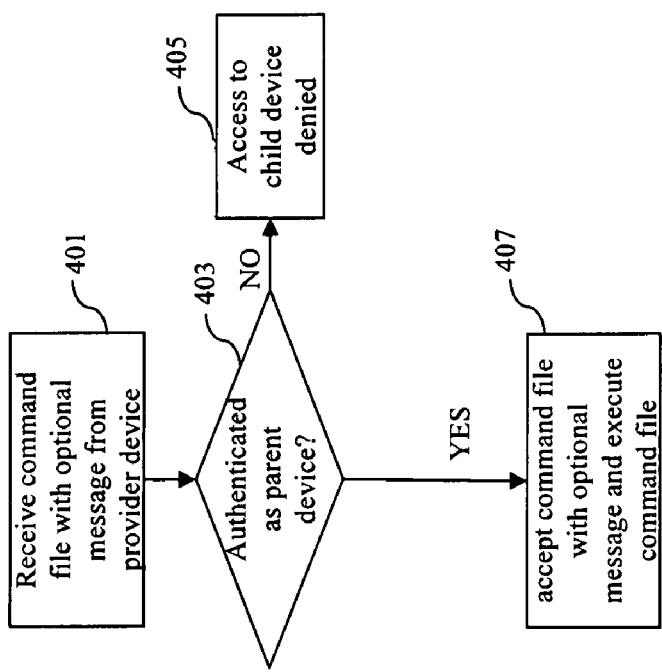
FIG. 4 is a flow chart illustrating locking operation of a child mobile station through a mobile station to mobile station authentication procedure in accordance with an embodiment.
Figure 3:
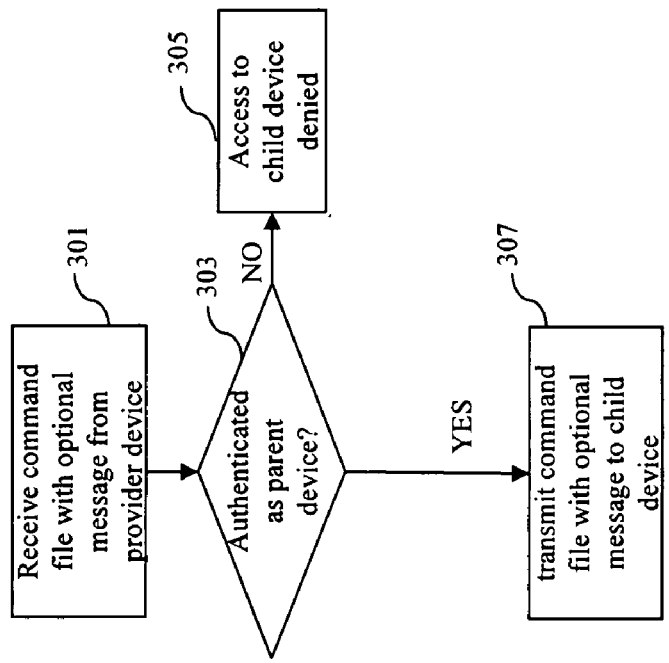
FIG. 3 is a flow chart illustrating locking operation of a child mobile station through a network authentication procedure in accordance with an embodiment.

FIG. 3 and FIG. 4 illustrate two embodiments in which authentication procedures are invoked prior to sending the command message to the child mobile station. FIG. 3 may be used by a network entity where the network entity receives the command from a parent mobile station as in 301. The network entity may authenticate the parent mobile station in 303. Alternatively, the network entity may communicate with a second network entity, for example and Authentication and Authorization (AAA) server to determine whether the parent mobile station is authorized to send commands to a specific child mobile station or a specific group of child mobile stations.

If the authentication fails, access will be denied in 305 and the mobile station attempting to act as a parent mobile station may be blacklisted such that any further control attempts would be immediately blocked.

If the mobile station is authenticated as a legitimate parent mobile station in 303 then the network entity will proceed to transmit the command to the child mobile station for execution.

Some embodiments may alternatively, or additionally, employ a mobile station to mobile station authentication procedure. It is to be understood that the authentication procedures employed may be any suitable authentication procedures and that use of any such authentication procedures would remain in accordance with the embodiments illustrated by FIG. 3 and FIG. 4.

Returning to FIG. 4, the child mobile station may receive the command from an alleged parent mobile device as in 401. For the embodiment illustrated in FIG. 4, and in block 403, the command file may be subjected to authentication procedures using various methods as would be understood by one of ordinary skill.

If the files fail authentication in 403, access would be denied as in 405, and the file or files may also be deleted in some embodiments. If authentication is successful in 403, then the child mobile station will proceed to accept and executer the command in 407.

Figure 5:
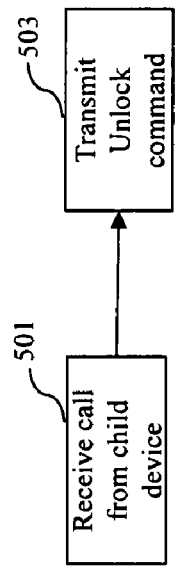
FIG. 5 is a flow chart illustrating an unlocking command in accordance with an embodiment.

FIG. 5 illustrates the unlocking command where the parent mobile station receives a call from the child device. The user of the parent mobile station may then use the user interface of the parent mobile station to transmit the unlock command to the child mobile station as in 503. The unlock command may also be subjected to the authentication procedures as discussed with respect to FIG. 3 or FIG. 4 in some embodiments. The child mobile station may in some embodiments, upon placing the call back to the parent mobile station, be prohibited from hanging up or taking any other action until a subsequent command is received from the parent mobile station, for example, the unlock command.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a child mobile station, the method comprising:
   receiving from a parent mobile station a command message, said command message specifying functions of said child mobile station to be locked;
   locking, by said child mobile station, said functions in response to receiving said command message;
   monitoring, by said child mobile station, a user interface of said child mobile station in response to receiving said command message;
   detecting, by said child mobile station, an action of said user interface; and
   dialing, by said child mobile station, a call to a telephone number of said parent mobile station, while said functions are locked, in response to detecting said action.

2. The method of claim 1, further comprising:
   overriding a mode setting of said child mobile station and providing an alert message, said alert message indicating that said child mobile station has been locked for said functions.

3. The method of claim 2, further comprising:
   receiving a file included with said command message, said file being one of an audio file, video file, video file with audio, or text file; and
   using said file as said alert message.

4. The method of claim 1, wherein monitoring a user interface further comprises:
   monitoring for key presses of a keypad of said child mobile station;
   detecting a key press;
   determining whether said key is the first digit of an emergency number sequence;
   waiting for a predetermined time period for said emergency number sequence to be completed; and
   placing a call to said emergency number if said emergency number sequence is completed.

5. The method of claim 1, wherein receiving said command message further comprises:
   receiving one of a Short Message Service message or a Session Initiation Protocol message.

6. The method of claim 1, wherein monitoring a user interface of said child mobile station further comprises:
   monitoring a touch screen of said child mobile station for touch screen activation.

7. The method of claim 1, further comprising:
   performing an authentication procedure on said command message;
   successfully authenticating said command message using said authentication procedure; and
   executing said command message.

8. A child mobile station, comprising:
   a processor configured to receive from a parent mobile station a command message, said command message specifying functions of said child mobile station to be locked;
   wherein said processor locks said functions in response to receiving said command message; said processor monitors a user interface of said child mobile station; said processor detects an action of said user interface; and said processor dials a call to a telephone number of said parent mobile station, while said functions are locked, in response to detecting said action of said user interface.

9. The child mobile station of claim 8, wherein said processor is further configured to override a mode setting of said child mobile station and provide an alert message, said alert message indicating that said child mobile station has been locked for said functions.

10. The child mobile station of claim 8 wherein said processor is further configured to monitor a user interface by:
   monitoring for key presses of a keypad of said child mobile station;
   detecting a key press;
   determining whether said key is the first digit of an emergency number sequence;
   waiting for a predetermined time period for said emergency number sequence to be completed; and
   placing a call to said emergency number if said emergency number sequence is completed.

11. The child mobile station of claim 10, wherein said processor is further configured to monitor a user interface of said child mobile station by monitoring a touch screen of said child mobile station for touch screen activation.

12. The child mobile station of claim 8, wherein said processor is further configured to receive a file included with said command message, said file being one of an audio file, video file, video file with audio, or text file; and use said file as said alert message.

13. The child mobile station of claim 8, wherein said processor is further configured to receive said command message by receiving one of a Short Message Service message or a Session Initiation Protocol message.

14. The child mobile station of claim 8, said processor further configured to run an authentication procedure on said command message.

* * * * *